March 31, 1953  W. B. WATSON ET AL  2,633,032
ADJUSTABLE GEARING DEVICE
Filed Feb. 14, 1951
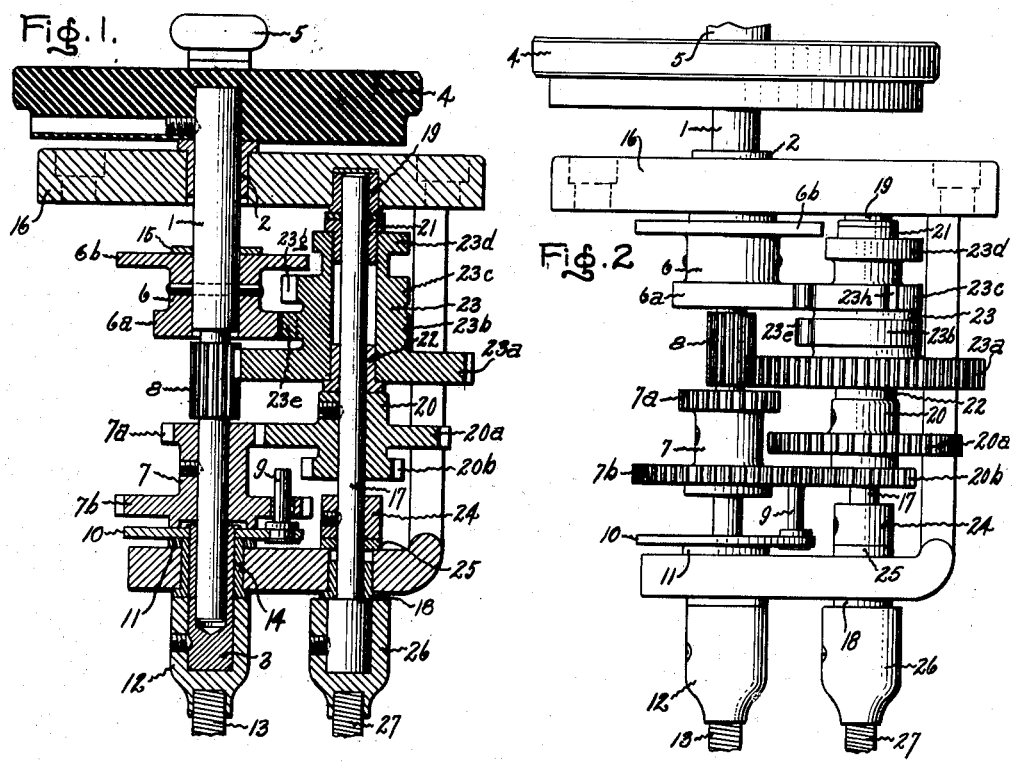
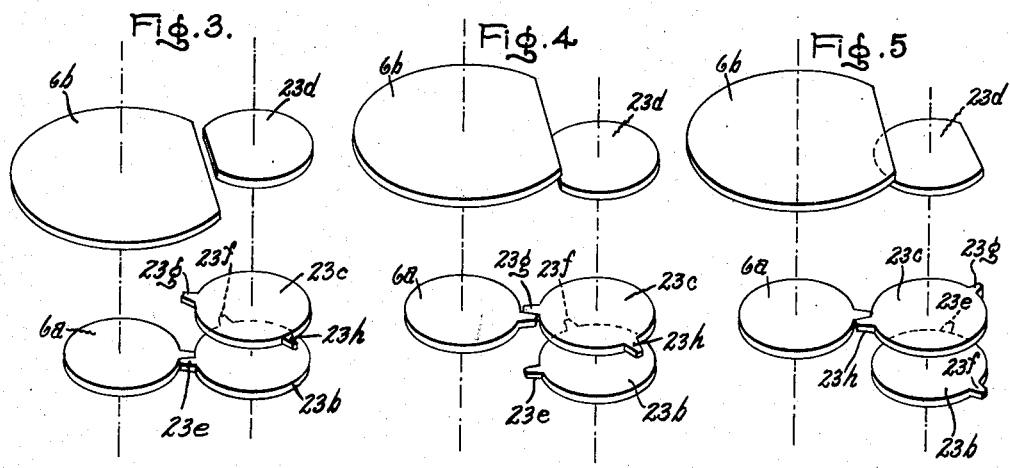
Inventors
Wallace B. Watson,
Arthur D. Wilson,
by Merton D. Morse
Their Attorney Patented Mar. 31, 1953

2,633,032

UNITED STATES PATENT OFFICE 2,633,032

ADJUSTABLE GEARING DEVICE

Wallace B. Watson, Clay, and Arthur D. Wilson, Central Square, N. Y., assignors to General Electric Company, a corporation of New York Application February 14, 1951, Serial No. 210,938

5 Claims. (Cl. 74—344)

1

This invention relates to devices for transmitting mechanical power between rotating shafts and more particularly to devices capable of adjustment to provide a plurality of input to output shaft speed ratios.

In the field of measuring instruments, particularly of the visual indicating type where a display is presented along a given base line, it is often desirable to employ a calibrated marker or pointer to read off the measured data. For example, in the case of radar type obstacle detection where the detected objects are displayed in spaced position along a given time base, in accordance with the range of the respective objects from a reference position, an electronic marker signal is generated and its position along the time base is manually controlled by the operator. The manual control is calibrated with great accuracy, thereby permitting a precise measurement when the control is adjusted to obtain coincidence of the marker and the indication corresponding to the detected object. One such control comprises manual rotation of a shaft which controls the position of the marker along the time base. The rotation of the shaft is calibrated to read the range of the detected object, the calibration ordinarily being in yards for short ranges, for example up to fifty miles, and miles for longer ranges.

However, operationally, it is desirable that the marker indication move slowly along the time base for short ranges of the detected objects, and then move more rapidly along the time base for the longer ranges of the detected object. A need thus exists for a control device which, with relatively the same input shaft speed of rotation, will produce one output shaft speed for close ranges and a higher output shaft speed for the more distant ranges. Of course, to rule out human error, such a device should be foolproof in that the output to input speed or gear ratio should not be left to the discretion of the operator. Rather, the device should include mechanical interlocking so that from the zero position to a certain range, for example fifty miles, only one gear ratio can be used while above that range only the other gear ratio can be used until the limit of the system is reached.

It is an object of this invention, therefore, to provide an adjustable gearing device which is rotatable for a predetermined number of revolutions between a zero position and a limit position, and in which adjustment of the gears can be made at only one point in the travel between the zero and limit positions.

It is a more specific object of this invention

2 to provide such an adjustable gearing device in which, due to mechanical interlocking, only one gear ratio may be employed between the zero position and the adjusting point and only the other gear ratio may be employed between the adjusting point and the limit position.

In an adjustable gearing device embodying this invention, there is provided a manually operable input shaft which is rotatably mounted and axially movable to a pair of predetermined positions. Mounted on its input shaft are a cam disc which is provided with a recess, a single-tooth gear, a plurality of output spur gears, and a signalling spur gear. Disposed to be driven by the output spur gears are a plurality of actuated spur gears which are mounted on a rotatable output shaft. Each of the actuated spur gears engages a different one of the output spur gears depending upon the axial position of the input shaft to provide different speed ratios between the input and output shafts.

Also disposed to be driven by the input shaft is a rotatable signalling unit. Included in this signalling unit in fixed angular relationship to each other are an actuating spur gear, a pair of double-tooth gears, and a cam disc. The actuating spur gear is arranged to engage the signalling spur gear at both axial positions of the input shaft, while the double-tooth gears are each disposed to coact with the single-tooth gear at a different one of the axial positions of the input shaft. Means are thereby provided which limit the number of revolutions that the input shaft may make in either of its axial positions. Moreover, the angular positions of the double-tooth gears with respect to each other are correlated so that one of the limits placed on the rotation of the input shaft in either of its axial positions occurs at the same angular position of the input shaft with respect to the signalling unit, this midstop position being reached in one axial position of the shaft by rotation in one direction and being reached in the other axial position of the shaft by rotation in the other direction. Thus, the travel in either axial shaft position does not overlap the travel in the other position. The cam disc of the signalling unit is arranged to coact with the recessed cam disc on the input shaft to permit displacement of the input shaft between its axial positions at the above-mentioned midstop position of the signalling unit with respect to the input shaft, and only at that shaft position.

Thus, to go from the zero position of the device to the limit position, or vice versa, one axial position of the input shaft is employed to go from the zero position to the midstop or adjusting position, the other axial position must be employed to go from the adjusting position to the limit position. Since the gearing between the input and output shafts is dependent upon the axial position of the input shaft, the desired result of two different output to input shaft speed ratios is thereby attained.

For a better and more complete knowledge of my invention, together with additional objects and advantages thereof, reference should now be had to the following description and accompanying drawing in which:

Fig. 1 is a longitudinal view in section of an adjustable gearing device embodying this invention, the device being shown in the midstop or adjusting position with the input shaft displaced to one of its axial positions;

Fig. 2 is a longitudinal view of the device of Fig. 1, also showing the device in the adjusting position but with the input shaft displaced to its other axial position;

Fig. 3 is a diagrammatic sketch showing the single- and double-tooth gear means used to limit the travel of the device, as well as the cam means used to prevent displacement of the input shaft except at the adjusting point, the illustrated angular and axial positions of the cam and gear means being that which occurs when the input shaft is in the position shown in Fig. 1;

Fig. 4 is another diagrammatic sketch of the gear and cam means shown in Fig. 3 illustrating their positions when the input shaft is in the position shown in Fig. 2; and Fig. 5 is still another diagrammatic sketch of the gear and cam means showing them in the limit position.

Referring to Fig. 1, in a preferred embodiment of our invention, a shaft 1 is journaled for rotation in a stationary bearing member 2 and a rotatable bearing member 3. Means for rotating shaft 1 is provided by a handwheel 4, on which a knob 5 is mounted for ease of operation.

Secured to shaft 1 so as to be rotatable therewith are gear members 6 and 7, and formed as an integral part of the shaft is a spur gear 8. Member 6 includes a single-tooth gear 6a, and a cam disc 6b, which is provided with a circular segmental recess, i. e., flatted on one side; and member 7 includes two output spur gears 7a and 7b of different diameters and conventional design. Cut in the larger diameter gear 7b is an aperture through which there extends a pin 9. Pin 9 is secured to an annular member 10, which in turn is mounted on bearing member 3. Also mounted on bearing member 3 are a washer 11 and a coupling 12 for a flexible output shaft 13. Shaft 13 thus turns when bearing member 3 rotates in the stationary bearing member 14, in which it is journaled for rotation.

Shaft 1 is not only mounted rotatably, but it also may be displaced axially within certain limits, member 7 striking member 10 to provide a stop in one direction and a positioning washer 15 secured to shaft 1 striking the frame 16 of the device to provide the stop in the other direction. Bearing 3 and the various members secured to it, however, are not axially movable.

The various gear members mounted on shaft 1 are arranged to cooperate with gear members which are mounted on an adjacent shaft 17. Shaft 17 is journaled for rotation in stationary bearings 18 and 19 and is not movable axially. Secured directly on shaft 17 is a gear member 20, while disposed around shaft 17 but rotatable with respect to it on bearing members 21 and 22 is a signalling unit or gear member 23. Gear member 20 includes spur gears 20a and 20b, which respectively engage gears 7a and 7b, depending upon the axial position of shaft 1, and gear member 23 includes an actuating spur gear 23a, double-tooth gears 23b and 23c, and cam disc 23d. As is shown in Fig. 3, and as will be more fully described hereinafter, the teeth 23e and 23f of gear 23b, and the teeth 23g and 23h of gear 23c, cooperate with the single tooth of gear 6a for signalling the angular position of shaft 17 with respect to shaft 1, while cam disc 23d together with cam disc 6b prevents axial movement of shaft 1 except at one predetermined angular position of cam 6b with respect to cam 23d. For that purpose, cam disc 23d may be provided with a circular segmental recess.

As previously mentioned, shaft 17 is not movable axially. In order to prevent axial movement of shaft 17 in one direction a positioning member 24 and a washer 25 are mounted on the shaft, while the coupling 26 by which the output shaft 27 is linked to shaft 17 prevents movement in the other direction.

In operation, shaft 1 is both rotated and moved axially, when such movement is possible, by means of handwheel 4. The axial movement is possible only when the cams 6b and 23d are in the position shown in Figs. 1, 2, 3, and 4. Figs. 1 and 3 illustrate shaft 1 displaced to the axial position where gear 7a meshes with gear 20a for one output speed ratio between shafts 1 and 17, while Figs. 2 and 4 illustrate the shaft displaced to its other position where gear 7b meshes with gear 20b to provide the other output speed ratio. In either case, shaft 17 turns in the opposite direction of rotation to shaft 1.

Viewing the device from the handwheel end, if the device is in the position of Fig. 1, shaft 1 can be rotated only in the counterclockwise direction. This is due to the fact that if it is attempted to rotate shaft 1 in the clockwise direction, gears 6a and 8 attempt to rotate member 23 at different speeds, which results in locking of the device. Specifically, the single tooth of gear 6a meshes with tooth 23e of gear 23b to drive member 23 at one speed, while gear 8 meshes with gear 23a to drive it at another speed. Of course, this prevents any movement at all of member 23 and thus of shafts 1 and 17.

However, if the handwheel is turned in the counterclockwise direction, there is no interference since the single tooth of gear 6a moves away from tooth 23e, as gear 6a is turned more rapidly by shaft 1 than member 23 is turned by gear 8. By the time gear 6a has made one revolution, gear 23b has turned sufficiently that the tooth of gear 6a does not contact tooth 23e, and additional rotation of shaft 1 and thus of shaft 17 may continue. However, after a number of revolutions, in this case 5 revolutions of the input shaft, gear 23b has rotated sufficiently that the tooth of gear 6a contacts tooth 23f. This locks the device due to the same type of interaction as described above and prevents further rotation of either shaft. Thus, with shafts 1 and 17 in the positions shown in Fig. 1, 5 revolutions of shaft 1 may be made in the counterclockwise direction and rotation in the clockwise direction is impossible. The output speed of shaft 17, and thus of shaft 27, throughout the 5 revolutions of shaft 1 depends upon the ratio of the diameters of gears 7a and 20a.

Rotation of shaft 1 in the clockwise direction from the position of Fig. 1 may be obtained, however, by displacing shaft 1 axially to the position shown in Fig. 2. This is possible since the flats on cam discs 6b and 23d are juxtaposed, thus permitting movement of shaft 1. As shaft 1 is displaced, gears 8 and 23a still remain in engagement. Rotation in the clockwise direction may then be accomplished and continued until gear 23c rotates sufficiently for tooth 23h and the single tooth of gear 6a to come into contact. In the illustrated device, this occurs after four revolutions of shaft 1, the output speed of shaft 17 being dependent upon the ratio of the diameters of the gears 7b and 20b. The contact of the single tooth of gear 6a and tooth 23h results in the same type of locking as described above. This locking is illustrated in Fig. 5, which also shows how cams 6b and 23d coact to prevent axial displacement of shaft 1 except at the one desired adjusting position.

Returning again to the positions illustrated in Fig. 2, motion of shaft 1 in the counterclockwise direction is prevented by the interaction of the single-tooth gear 6a and tooth 23g of gear 23c. As previously mentioned, however, by displacing shaft 1 to the position of Fig. 1, rotation may continue in the counterclockwise direction. Assuming that such displacement of shaft 1 has been made, and handwheel 4 then turned for 5 turns so that tooth 23f and the single tooth of gear 6a have come into contact to prevent further counterclockwise rotation, shafts 1 and 17 are then in the zero range position, when, for example, the device is used to control a range marker. Now, as the handwheel is turned in the clockwise direction, the range marker as driven by shaft 27 moves outwardly at a certain rate of speed, depending upon the gearing between shafts 1 and 17. After a certain predetermined distance of travel of the range marker at this first rate, i. e., 5 turns of handwheel 4, single-tooth gear 6a engages tooth 23e of gear 23b, stopping movement of the range marker and signalling that the gear should be shifted, i. e., shaft 1 displaced to the position shown in Fig. 2, for more efficient operation of the range marker. Once this is done, the range marker again may be moved outwardly, but now at a different rate of travel, until gear 6a contacts tooth 23h of gear 23c after four turns of handwheel 4. This signals that the range marker has been moved to the limit of the system.

The different rates of travel of the range marker thus provide different accuracies of the system at different ranges. Thus, from the zero position up to a certain specified range, for example 50 miles, the gearing between shafts 1 and 17 provides a certain accuracy, i. e., distance moved by range marker per revolution of handwheel 4, while above that range the new gearing between the shafts provides a different accuracy. However, above the specified range, the necessity for increased speed of operation outweighs the accuracy factor. In fact, a primary purpose of the gear shifting device is to provide means for meeting this need for increased speed of operation and an important advantage of the device is that it includes means which require the correct speed to be used in each range.

The device illustrated in the drawing is intended to be merely illustrative. By different spacing of the teeth of the double-tooth gears, as well as by different arrangement of the gears and the cam discs, the device could be made operable over shorter or longer ranges. Moreover, member 23 could be mounted on a separate shaft rather than on shaft 17, if it were so desired. Thus, while there have been described what at present is considered to be the preferred embodiment of this invention, it will be obvious to those skilled in the art that various alterations and modifications may be made therein without departing from the invention, and it is, therefore, aimed in the appended claims to cover all such changes and modifications as fall within the true spirit and scope of the invention.

What we claim as new and desire to secure by Letters Patent of the United States is:

1. In an adjustable gearing device for transmitting mechanical power, a rotatable input shaft axially movable to a pair of predetermined positions having mounted thereon a cam disc provided with a recess; a single-tooth gear; a plurality of output spur gears; and a driving gear; a rotatable output shaft having mounted thereon a plurality of spur gears each for engaging a different one of said output spur gears to provide different speed ratios between said input and output shafts depending upon the axial position of said input shaft; a rotatable gear unit including in fixed angular relationship to each other a driven gear arranged to be driven by said driving gear, a pair of double-tooth gears each disposed to coact with said single-tooth gear at a different one of said axial positions of said input shaft to provide means for limiting the number of revolutions of said shafts in either of said positions, and a cam disc arranged to coact with said input shaft cam disc to permit displacement of said input shaft from one of said axial positions to the other of said axial positions at only one angular position of said gear unit with respect to said input shaft.

2. In an adjustable gearing device for transmitting mechanical power, a rotatable input shaft axially movable to a pair of predetermined positions having mounted thereon a cam disc provided with a circular segmental recess, a single-tooth gear, a plurality of output spur gears, and a driving gear; a rotatable output shaft having mounted thereon a plurality of spur gears, each for engaging a different one of said output spur gears to provide different speed ratios between said input and output shafts depending upon the axial position of said input shaft; a gear unit disposed in coaxial and rotatable relation with respect to said output shaft and including in fixed angular relationship to each other a driven gear arranged to be driven by said driving spur gear, a pair of double-tooth gears each arranged to coact with said single-tooth gear at a different one of said axial positions of said input shaft to provide means for limiting the number of revolutions of said shaft in either of said positions, and a cam disc provided with a circular segmental recess and arranged to coact with said input shaft cam disc to permit displacement of said input shaft from one of said axial positions to the other of said axial positions at only one angular position of said gear unit with respect to said input shaft.

3. In combination with a pair of rotatable shafts, means coupled to each of said shafts for providing a mechanical connection therebetween and including a pair of portions displaceable relative to one another between first and second operating positions, each of said positions determining an individual transmission ratio between said shafts, means responsive to the rotational position of one of said shafts for preventing relative displacement of said portions for any rotational position of said one shaft exclusive of a reference position, and stop means for limiting rotational movement of said one shaft to a predetermined number of revolutions in each direction from said reference position.

4. In combination, a first rotatable shaft, a second axially movable, rotatable shaft, means coupled to each of said shafts for providing a mechanical connection therebetween and including a pair of portions displaceable relative to one another with axial movement of said second shaft between first and second operating positions, each of said positions determining an individual transmission ratio between said shafts, means responsive to the rotational position of said second shaft for preventing axial displacement thereof for any rotational position of said second shaft exclusive of a reference position, and stop means for limiting rotational movement of said one shaft to a predetermined number of revolutions in each direction from said reference position.

5. In combination with a pair of rotatable shafts, means coupled to each of said shafts for providing a mechanical connection therebetween and including a pair of portions displaceable relative to one another between first and second operating positions, each of said positions determining an individual transmission ratio between said shafts, means responsive to the rotational position of one of said shafts for preventing relative displacement of said portions for any rotational position of said one shaft exclusive of a reference position, and stop means responsive to the positioning of said portion for limiting rotational movement of said one shaft between said reference position and a predetermined number of revolutions in one direction for said first operating position of said portions and for limiting rotational movement of said one shaft between said reference position and a predetermined number of revolutions in the opposite direction for said second operating position of said portions.

WALLACE B. WATSON.
ARTHUR D. WILSON.

No references cited.